Jan. 16, 1962
S. TABORSKY
3,017,621
PROXIMITY LIMIT POSITION DETECTOR
Filed Dec. 31, 1956
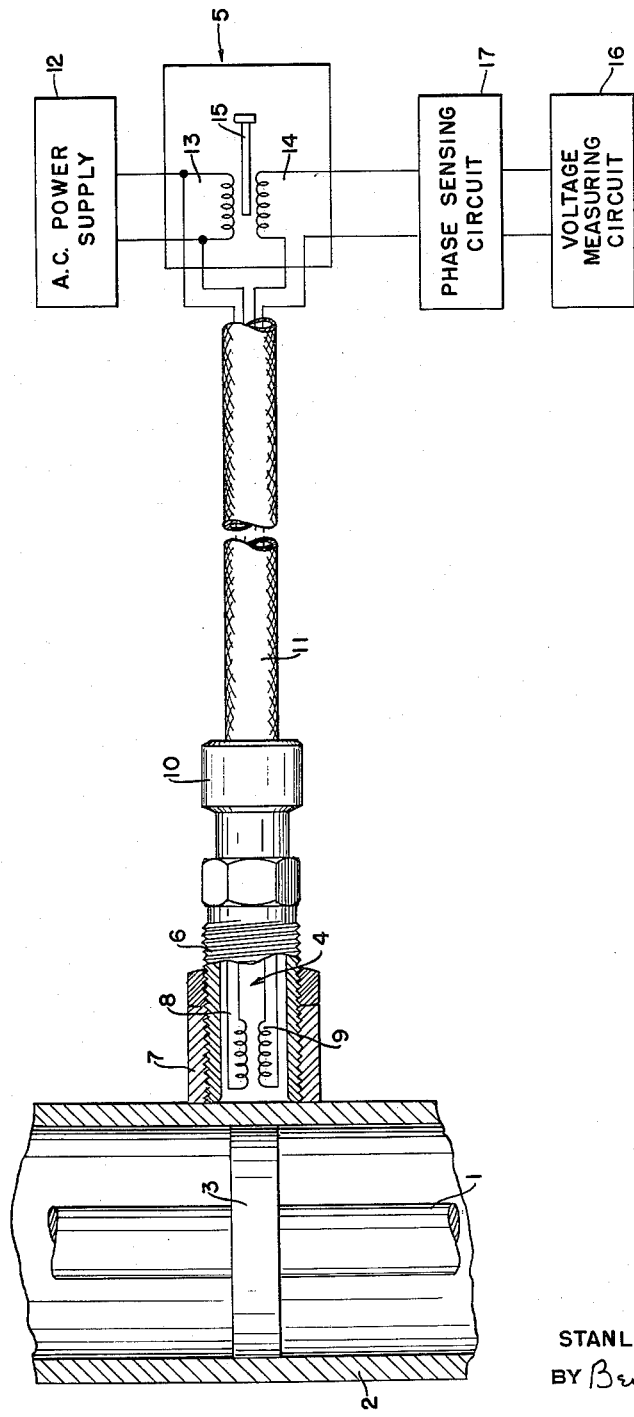
INVENTOR
STANLEY TABORSKY
BY Benjamin G. Weil
ATTORNEY

United States Patent Office 3,017,621
Patented Jan. 16, 1962

3,017,621
PROXIMITY LIMIT POSITION DETECTOR
Stanley Taborsky, Towson, Md., assignor to Martin-Marietta Corporation, a corporation of Maryland
Filed Dec. 31, 1956, Ser. No. 631,659
5 Claims. (Cl. 340—282)

The present invention relates to an electrical proximity device for detecting the arrival of a moving element containing magnetic material at a preselected limit position along a predetermined travel path, and more particularly to such a device for detecting the limit position of a control rod in a nuclear reactor.

The accurate detection of the arrival of the control rod of a nuclear reactor at preselected limit positions along its predetermined travel path is of primary importance in the maintenance of a reliably controlled nuclear reaction. With nuclear reactors employing a sealed-type control rod enclosed within a pressure vessel wall such detection cannot be conventionally effected because of the inaccessibility of the control rod to contact limit position detecting means.

The present invention provides a simple, accurate, and reliable electrical detecting device which may be externally arranged with respect to the pressure vessel wall surrounding a control rod to detect the arrival of the rod at preselected limit positions along its predetermined travel path.

To this end the invention comprises a proximity pick-up transformer having a primary winding and a separate secondary winding. An alternating current supply is connected to energize the primary winding of the pick-up transformer and to induce a voltage across the secondary winding.

To permit of proximity detection with the pick-up transformer the control rod must contain magnetic material, or be provided with a slug of magnetic material. Thus by positioning the pick-up transformer so that its magnetic field is in coupling relationship with the control rod in its travel path, the coupling between its primary and secondary windings will vary with movement of the control rod. In this way variations in the voltage across the secondary winding will be induced depending upon the position of the control rod along its predetermined travel path.

To detect the arrival of the control rod at a preselected limit position along its travel path the invention provides a balancing transformer having a primary winding and a separate secondary winding. The balancing transformer must be substantially isolated magnetically from the moving element in its travel. Remote arrangement of the balancing transformer from the travel path or magnetic shielding may be employed for this purpose.

The secondary windings of the pick-up transformer and the balancing transformer are series connected in opposing polarity relationship. Thus the individual voltages induced across each secondary winding are subtracted one from the other. An alternating current supply is connected to energize the primary winding of the balancing transformer and to induce a preselected voltage across its secondary winding. The value of this preselected voltage is such as to cancel the voltage induced across the secondary winding of the pick-up transformer when the control rod is at the preselected limit position. Limit position arrival of the control rod is therefore deected by a zero voltage reading of the resultant voltage developed across the series combination of secondary windings and may be indicated by a conventional voltmeter device.

The invention can best be understood by referring to the following drawing in which the single figure is an elevation view, partly in cross-section and partly schematic, of the improved proximity limit position detector.

The figure shows a partial view of a sealed-type control rod 1 as utilized in a nuclear reactor arranged to move longitudinally within a pressure vessel wall 2. The vessel wall and control rod are preferably of non-magnetic material, the control rod being fitted with a slug of magnetic material 3.

The detector comprises a proximity pick-up transformer indicated generally at 4 which may be of the air core type as illustrated and a balancing transformer indicated generally at 5. The pick-up transformer is mounted within an externally threaded housing 6. An internally threaded mounting boss 7 is externally attached to the pressure vessel wall 2 of the reactor at a preselected position relative to the magnetic slug limit position. The pick-up transformer 4 is mounted on the outer surface of the pressure wall by threading the housing 6 into the mounting boss 7. No penetration of the pressure wall or encircling of the magnetic slug is required. The input leads to the primary winding 8 and the output leads from the secondary winding 9 of the pick-up transformer are led out of the transformer housing 6 through a disengageable connector 10 and cable 11.

The leads from the primary winding are connected through the cable to a source of alternating current voltage 12. This energizing voltage is preferably of low frequency (60 cycles per second) in order to limit eddy current losses in the vessel wall and magnetic slug. The energizing voltage applied to the primary winding 8 produces a magnetic field which induces a voltage in the secondary winding 9.

In order for the proximity pick-up transformer to detect the moving magnetic slug it is necessary that it be positioned so that its magnetic field effectively includes the travel path of the magnetic slug. In his way movement of the magnetic slug varies the coupling between the primary winding 8 and the secondary winding 9 in direct relation to the position of the slug. This in turn varies the voltage induced across the secondary winding 9, thus providing a readily measurable voltage which is indicative of magnetic slug position.

The disclosed pick-up transformer has been successfully operated through a non-magnetic 347 stainless steel ¼ inch wall to detect the presence or absence of a feebly magnetic slug of 430 stainless steel. These two materials are compatible with the anticorrosion requirements of a pressurized water system in a nuclear reactor. The pick-up transformer in this instance was a bobbin ½ inch in diameter by ½ inch long. Detection through a thicker wall would simply require a transformer providing a stronger and more extensive magnetic field.

The pick-up transformer having no wearing parts is very reliable in operation. This is especially advantageous because of its critical requirements in the operation and control of nuclear reactors, and because of the inaccessible locations in which it may be required to be placed. In addition the pick-up transformer is unaffected by vibration, or by wide variation in temperature, pressure, and humidity.

The vessel wall 2 and rod 1 of the reactor are preferably of non-magnetic material so as not to short-circuit the transformer flux. The presence of water such as is used as a coolant and as shielding in pressurized water reactor systems will have no effect since its magnetic permeability is equivalent to air. The pick-up transformer can be readily encapsulated to permit of its operation submerged in the liquid.

In the illustrated embodiment the cable 11 is of sufficient length so that the balancing transformer 5 may be disposed remotely from the pick-up transformer 4. In this way the magnetic coupling between its primary and secondary windings is substantially unaffected by the magnetic slug. Other means such as shielding may be employed to magnetically isolate the balancing transformer from the travel path of the magnetic slug.

The alternating current voltage source 12 provides energizing voltage for the primary winding of the balancing transformer. Preferably the same source is employed to energize the primary windings of both the pick-up transformer and the balancing transformer so that the system in operation is independent of power voltage fluctuations. The secondary windings 9 and 14 of the pick-up transformer and balancing transformer are connected in series in opposing polarity relationship so that the individual voltages induced across the respective secondary windings are subtracted one from the other.

A typical application of the limit position detector will now be described to better illustrate the invention, though the invention is not so limited. In this application the pick-up transformer 4 is arranged immediately adjacent the magnetic slug in its preselected limit position. The voltage thus induced across the secondary winding 9 of the pick-up transformer will have its maximum value when the magnetic slug 3 is at this limit position, and will decrease in value when the magnetic slug is moved away from that position in either direction.

The value of the voltage induced across the secondary winding 14 of the balancing transformer is then adjusted to be equal to the value of the voltage induced across the secondary winding 9 of the pick-up transformer when the magnetic slug is at its limit position, thus producing a cancellation of these opposing voltages at that position.

Adjustment of the value of the secondary voltage of the balancing transformer may be effected in many ways. For limited applications the balancing transformer may be designed to have a fixed value of secondary output voltage. To increase the versatility of the instrument and to permit the detector to be adjusted and calibrated by means remote from the pick-up transformer adjustable means may be employed to vary the value of the voltage induced across the secondary winding 14. Preferably such adjustable means comprises a movable core 15 arranged such that variations of its position relative to the primary winding 13 and secondary winding 14 result in variations of the magnetic coupling therebetween.

Having adjusted the secondary voltage of the balancing transformer to the aforesaid value the resultant voltage across the series combination of the secondary windings will be zero when the slug arrives at the limit position. Voltage measuring circuit 16 which may be a conventional voltmeter is connected across the series combination of the secondary windings 9 and 14 to measure a zero value of the resultant voltage developed thereacross, and thus indicate the arrival of the magnetic slug 3 at the limit position. Switching means or other control means adapted to be actuated when the voltage across the secondary winding series combination is zero may be provided for effecting functions called for upon the arrival of the magnetic slug at the limit position.

The limit position detector of the present invention may also be operated in a biased condition to produce indications of overtravel of the control rod in either direction from a preselected central position. For example, the voltage induced across the secondary winding of the balancing transformer 5 may be set at a value such as to cancel the voltage induced across the secondary winding of the pick-up transformer 4 when the magnetic slug 3 of the control rod is at a limit position displaced a preselected distance above or below the central position adjacent the pick-up transformer.

The voltage measuring circuit 16 will therefore measure a zero value of the resultant voltage across the series combination of the secondary windings when the magnetic slug is at either of these limit positions. With the magnetic slug between these limit positions, the secondary voltage of the pick-up transformer 4 will be larger than the secondary voltage of the balancing transformer 5. The resultant voltage across the secondary windings will therefore be of the same phase as the voltage induced across the secondary winding of the pick-up transformer 4, and will have its maximum value when the magnetic slug is at the central position directly adjacent the pick-up transformer. When the magnetic slug is outside these limit positions, either below or above, the secondary voltage of the balancing transformer will be larger than the secondary voltage of the pick-up transformer. The resultant output voltage across the series combination of the secondary windings will therefore be of the same phase as the voltage induced across the secondary winding of the balancing transformer 5.

The individual voltages developed across the respective secondary windings of the pick-up and balancing transformers are 180° out of phase because of their opposing polarity relationship. The resultant voltage across the series combination of the secondary windings will therefore shift 180° in phase when the slug passes through the limit positions. An indication of slug position with respect to the limit positions may therefore be effected by the provision of a conventional phase sensing circuit 17. Voltage measuring circuit 16 is again employed to detect the arrival of the slug at the limit positions.

Many other arrangements may, of course, be employed. For example, the detector may be employed as a tachometer for rotative as well as linear motion. The described examples of operation are deemed sufficient to illustrate the possible uses of the present invention.

Preferred embodiments of the invention have been described. Various changes and modifications, however, may be made within the scope of the invention as set forth in the appended claims.

I claim:

1. An electrical proximity device for detecting the arrival of a selectively positionable element containing magnetic material at a preselected limit position along a predetermined travel path, comprising a proximity pick-up transformer having a primary winding and a single separate secondary winding disposed in magnetic field coupling relationship with substantially the said travel path of the said element, said pick-up transformer primary winding having terminals for connection to a source of alternating current voltage and being separated from said secondary winding by non-magnetic material, whereby when energized a voltage is induced across its said single secondary winding, means for positioning said selectively positionable element so that the voltage induced across said single secondary winding is proportional to the proximity of said magnetic material contained in said positionable element, a balancing transformer having a primary winding and a single separate secondary winding substantially isolated magnetically from the said travel path of the said element, the primary windings of said pick-up transformer and said balancing transformer being connected in parallel, the secondary windings of the said pick-up and balancing transformers being series connected in opposing polarity relationship to produce a resultant voltage derived from subtraction of the individual voltages induced across said secondary windings, an alternating current supply connected to energize the primary windings of said balancing transformer and said pick-up transformer, the primary winding of said balancing transformer being coupled to induce a preselected voltage across its said single secondary winding, the value of said preselected voltage being such as to cancel the voltage induced across the secondary winding of the said pick-up transformer when the said positionable element is at the said preselected limit travel position, and a voltage measuring circuit connected across the series combination of the said secondary windings adapted to measure a zero value of the said resultant voltage developed across said series combination, said zero voltage being indicative of the arrival of the said magnetic element at the said preselected limit position.

2. An electrical proximity device in accordance with claim 1 which further includes a phase sensing circuit connected across the series combination of said secondary windings adapted to produce an indication of the phase of the said resultant voltage developed across said series combination.

3. An electrical proximity device for detecting the arrival of a selectively positionable element containing magnetic material at a preselected limit position along a predetermined travel path, comprising a proximity pick-up transformer having a primary winding and a single separate secondary winding disposed in magnetic field coupling relationship with substantially the said travel path of the said element, said pick-up transformer primary winding having terminals for the connection to a source of alternating current voltage and being separated from said secondary winding by non-magnetic material, whereby when energized a voltage is induced across its said single secondary winding, means for positioning said selectively positionable element so that the voltage induced across said single secondary winding is proportional to the proximity of said magnetic material contained in said positionable element, a balancing transformer having a primary winding and a single separate secondary winding substantially isolated magnetically from the said travel path of the said element, the primary windings of said pick-up transformer and said balancing transformer being connected in parallel, the secondary windings of said pick-up and balancing transformers being series connected in opposing polarity relationship to produce a resultant voltage derived from subtraction of the individual voltages induced across said secondary windings, an alternating current supply connected to energize the primary windings of said balancing transformer and said pick-up transformer, the primary winding of said balancing transformer being coupled to induce a voltage across its said single secondary winding, adjustable means for varying the voltage induced across the secondary winding of said balancing transformer to a preselected value such as to cancel the voltage induced across the secondary winding of the said pick-up transformer when the said positionable element is at the said preselected limit travel position, and a voltage measuring circuit connected across the series combination of the said secondary windings adapted to measure a zero value of the said resultant voltage developed across said series combination, said zero voltage being indicative of the arrival of the said magnetic element at the said preselected limit position.

4. An electrical proximity device in accordance with claim 3 in which the said adjustable means for varying the voltage induced across the secondary winding of the said balancing transformer comprises a movable magnetic core arranged to vary the magnetic coupling between the primary and secondary windings of the said balancing transformer.

5. An electrical proximity device for detecting the arrival of a selectively positionable element containing magnetic material at a preselected limit position along a predetermined travel path, comprising a proximity pick-up transformer having a primary winding and a single separate secondary winding disposed in magnetic field coupling relationship with substantially the said travel path of the said element, said primary and secondary windings of said pick-up transformer having non-magnetic material therebetween, an alternating current supply connected to energize the primary winding of the said pick-up transformer and to induce a voltage across its said secondary winding, means for positioning said selectively positionable element so that the voltage induced across said single secondary winding is proportional to the proximity of said magnetic material contained in said positionable element, a balancing transformer having a primary winding and a single separate secondary winding substantially isolated magnetically from the said travel path of the said element, said primary winding of said balancing transformer being connected in parallel with the said primary winding of said pick-up transformer so as to be energized by said alternating current supply, the secondary windings of said pick-up and balancing transformers being series connected in opposing polarity relationship to produce a resultant voltage derived from subtraction of the individual voltages induced across said secondary windings, adjustable means for varying the voltage induced across the secondary winding of said balancing transformer to a preselected value such as to cancel the voltage induced across the secondary winding of the said pick-up transformer when the said positionable element is at the said preselected limit travel position, said adjustable means comprising a movable magnetic core arranged to vary the magnetic coupling between the primary and secondary windings of the said balancing transformer, a phase sensing circuit connected across the series combination of the said secondary windings adapted to produce an indication of the phase of the said resultant voltage developed across said series combination, and a voltage measuring circuit connected across the series combination of the said secondary windings adapted to measure a zero value of the said resultant voltage developed across said series combination, said zero voltage being indicative of the arrival of the said magnetic element at the said preselected limit position.

References Cited in the file of this patent
UNITED STATES PATENTS

| | | |
|---|---|---|
| 2,321,356 | Berman | June 8, 1943 |
| 2,357,745 | Kliever | Sept. 5, 1944 |
| 2,572,481 | Hornfeck | Oct. 23, 1951 |
| 2,660,059 | Dean et al. | Nov. 24, 1953 |
| 2,731,624 | Krucoff | Jan. 17, 1956 |

FOREIGN PATENTS

| | | |
|---|---|---|
| 117,507 | Great Britain | Jan. 24, 1918 |

OTHER REFERENCES

ANL–4814, U.S. Atomic Energy Commission document dated June 1952, 12 pages.